United States Patent [19]

Wilwerding

[11] Patent Number: 4,595,272
[45] Date of Patent: Jun. 17, 1986

[54] CAMERA FOCUS INDICATOR

[75] Inventor: Dennis J. Wilwerding, Littleton, Colo.

[73] Assignee: Honeywell Inc., Minneapolis, Minn.

[21] Appl. No.: 277,563

[22] Filed: Jun. 25, 1981

[51] Int. Cl.⁴ .................................................. G03B 7/08
[52] U.S. Cl. ...................................... 354/409; 354/474; 354/289.1
[58] Field of Search ............... 354/25 R, 25 N, 60 R, 354/60 L, 195, 198, 289

[56] References Cited

U.S. PATENT DOCUMENTS

| | | | |
|---|---|---|---|
| 4,034,392 | 7/1977 | Ishizaka et al. | 354/289 |
| 4,192,590 | 3/1980 | Kitaura | 354/60 L |
| 4,240,727 | 12/1980 | Lermann et al. | 354/25 |
| 4,300,826 | 11/1981 | Aoki et al. | 354/289 |
| 4,322,141 | 3/1982 | Tominaga et al. | 354/198 |

FOREIGN PATENT DOCUMENTS 54-288133  1/1979  Japan .

OTHER PUBLICATIONS

U.S. application Ser. No. 168,225, filed Jul. 10, 1980, in the name of Richard Langlais, et al for Method and Apparatus for Determining Focus Direction and Amount.

Primary Examiner—Russell E. Adams
Attorney, Agent, or Firm—Charles J. Ungemach

[57] ABSTRACT

An indicator for use in an auto focus type camera, which produces an output signal of magnitude indicative of the amount the camera lens must move, and of a sign or characteristic indicative of the direction the camera lens must move in order to reach a desired focus position; the indicator comprising a plurality of light-emitting diodes a first group of which can only respond to a signal having the first characteristic and a second group of which can only respond to a signal having the second characteristic, but each of the detectors in both groups being responsive to signals of different magnitudes, so that upon the lighting of one of the light-emitting diodes, it can be determined how far the lens must move, and in what direction to achieve the desired proper focus position.

2 Claims, 2 Drawing Figures

CAMERA FOCUS INDICATOR

BACKGROUND OF THE INVENTION

In copending application Ser. No. 168,225 filed in the name of Langlais et al on July 10, 1980, an auto focus system was shown in which a signal was created indicative of the amount that the camera lens ought to be moved from its present position in order to reach a proper focus position with respect to a remote object and also the direction in which the lens should be moved to achieve this proper focus position. This output signal was shown operating a motive means which moved the lens to the proper focus position and also to an indicator used to display the amount and direction in which the taking lens is displaced from the proper focus position.

While a number of readily available indicators could conceivably be used to provide the type of indication desired, it has been found that none of these are well adapted for use in and on a camera so as to permit easy viewing by the photographer and/or by the subject being photographed.

SUMMARY OF THE INVENTION

The present invention provides an indicator useable in the auto focus system of the above-referred to copending application and which can be mounted in a camera to be viewed by the photographer through the viewing optics or can be mounted on the front of a camera to be viewed by the subject being photographed.

More particularly, the present invention utilizes a plurality of light emitting diodes connected, for example, in a line and mounted in or on the camera to be viewed by the photographer or the subject. The light emitting diodes are connected to the output of the auto focus circuit in the above-referred to copending application so that one of the diodes is lit to indicate the amount of displacement from the proper focus position and the direction necessary for proper focus. In the LED array, the center LED is utilized for showing when the proper focus position has been reached and on either side of the center LED, additional LEDs are used to show further and further displacements, either plus or minus, from the desired focus position at the center.

DETAILED DESCRIPTION OF THE PREFERRED EMBODIMENTS

Figure 1:
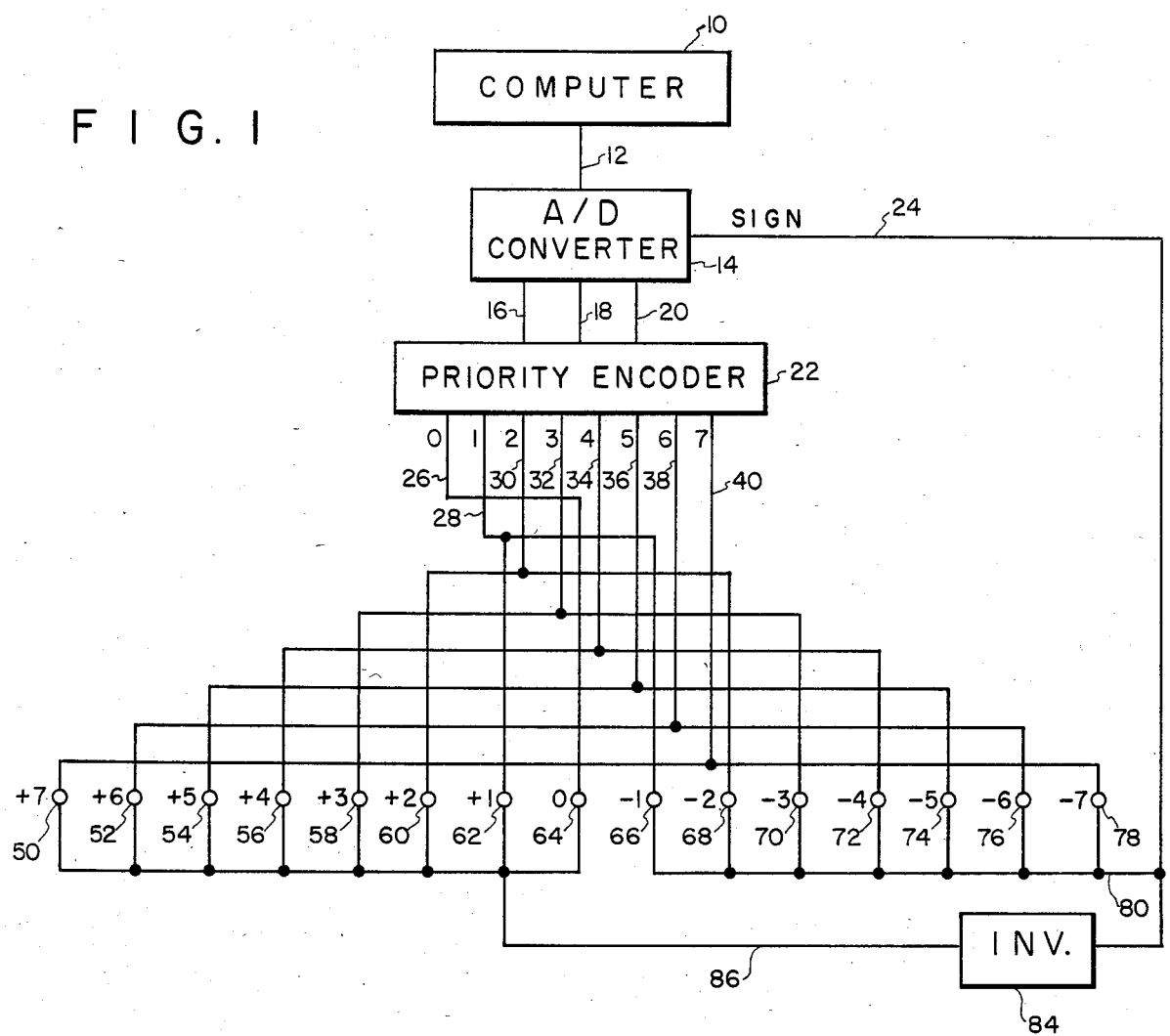
FIG. 1 shows a schematic diagram representing the connections to the indicator elements of the present invention.

Referring to FIG. 1, a computer 10 is shown which may be the same as the computer identified by reference numeral 100 in FIG. 8 of the above-referred to copending application Ser. No. 168,225. As described in that copending application, the output of the computer is a signal of magnitude indicative of the amount the camera lens must move to reach a desired focus position and of a sign or characteristic indicative of the direction the camera lens must move to reach the desired focus position. This output is shown in FIG. 1 of the present application on a line 12 which, in the above-referred to copending application, was identified by reference numeral 110 leading to a motive means which drove the lens to a proper focus position and which was connected by a conductor 122 to an indicator 120. In the previous application, this output may have been an analog signal of magnitude indicative of the amount of motion and of sign indicative of the direction or it may have been a digital word which was indicative of the magnitude along with a characteristic signal indicative of the sign. In the present application, it will be assumed that the output of the computer 10 is an analog signal and accordingly in FIG. 1 of the present application, this signal is presented to an A-to-D converter 14 to change the signal to a digital one although it is understood that in the event the output of the computer of the above-referred to copending application was itself a digital signal, then the presence of the A-to-D converter 14 in the present application would not be necessary.

In FIG. 1, the A-to-D converter converts the signal on line 12 to a digital word and the plus or minus sign to a digital indication thereof. The digital word indicative of the magnitude of the signal on line 12 appears on conductors 16, 18 and 20 in FIG. 1 which is presented to a priority encoder 22. The signal indicative of the sign of the signal on conductor 12 appears from the A-to-D converter 14 on a conductor 24 labelled "SIGN" and this signal may be, for example, a zero if the signal on conductor 12 is negative indicating that the lens has to be moved in a first direction to reach a proper focus position and may be a 1 if the signal on line 12 is either zero or positive indicating that the lens does not have to move or has to move in the other direction respectively.

The digital word which appears on conductors 16, 18 and 20 may be any value from zero to 7 and, of course, if a larger number of indicator elements are used than the 15 to be described below, additional outputs from A-to-D converter 14 could be employed so that greater numbers could be accommodated by the system.

The priority encoder 22 is a common device which operates to produce an output signal indicative of the magnitude of the signal received in digital word form at its input. More specifically, priority encoder 22 has a first output 26 upon which a signal such as a "1" or a positive signal will appear in the event that its input is receiving a digital word indicating that the magnitude of the signal on conductor 12 is zero. Likewise, an output from priority encoder 22 will appear on a conductor 28 in the form of a "1" or a positive signal whenever the digital word received from conductors 16, 18 and 20 is indicative of a signal of magnitude "1". In similar fashion, outputs will appear on conductors 30, 32, 34, 36, 38 and 40 in the form of a plus signal or a "1" whenever the digital word appearing on conductors 16, 18 and 20 is indicative of a magnitude 2, 3, 4, 5, 6 or 7 respectively. Only one of the outputs from priority encoder 22 will have a positive or "1" signal and the rest will a negative or "0" signal so it can be determined from knowing which one of the outputs of priority encoder 22 has a positive signal, the relative magnitude of the signal appearing on conductor 12 in FIG. 1.

FIG. 1 shows a plurality of 15 light devices which may be light emitting diodes identified by reference numerals 50–78. Each of these devices is capable of lighting whenever it receives a positive signal on its upper terminal and a negative signal on its lower terminal. As is seen in FIG. 1, these LED devices are arranged in a row and identified by numbers 0 in the middle and +1 through +7 extending to the left and −1 through −7 extending to the right. Whenever the output of computer 10 is zero, indicating a proper focus position, it is desired that the proper focus position LED 64, identified as 0, will light. On the other hand, if the output from computer 10 is of magnitude other than zero and of a positive sign indicating that the object is on one side of the proper focus position, it is desired that a proper one of the LEDs 50–62 will light. If the output from computer 12 is other than zero and of a negative sign indicating that the object is on the other side of the proper focus position, it is desired that the proper one of the LEDs 66–78 will light. The proper LED will depend upon how far the object is removed from the proper focus position.

As mentioned, the signal on conductor 12 from computer 10 has a magnitude indicative of the distance from the position the lens now occupies to the proper focus position and if the object to be focussed upon were at some medium range from the camera and if the camera lens were set at the infinity position, then a fairly large positive signal would exist on line 12 indicating that the lens should be moved in the positive or "near" direction to achieve proper focus. As the lens moved closer towards the correct focal position the magnitude of the positive signal would decrease until the lens reached the proper position at which time the signal on conductor 12 would be substantially zero. If the lens were to continue moving, a negative signal would develop which would increase in magnitude until the lens occupied the near position within its capability. Accordingly, in FIG. 1, it is desired that for the same situation with the lens at an infinity position and an object at a mid range, the LED +7 would light and as the lens approached the proper focus position, LED 6 would light and then 5 and then 4, etc. until the proper position was reached at which time the LED 64, identified as "0", would light. If the lens were to continue moving in the same direction, LED −1 would light, then −2 and −3, etc. until −7 would light indicating that the lens was at its near range capability. Of course, the error signal from computer 10 may be larger than that necessary to light the #7 LEDs when the out-of-focus condition is very large or, when the indicator is used with camera lenses which have greater than normal extensions but in this event, the #7 LED will saturate and remain lit until the lens passes the point where the magnitude of the signal on conductor 12 is in the normal range for the indicator after which point the operation will be as described above.

To accomplish the operation just described, the output of priority encoder 22 on line 26 indicative of a "0" is presented to the anode of LED 64. The output of priority encoder 22 on line 28, indicative of a "1", is presented jointly to the anodes of LED 62 and LED 66 indicative of +1 and −1 respectively. In similar fashion, the output of priority encoder 22 on conductor 30 is connected jointly to the anodes of LED 60 and LED 68 indicative of +2 and −2 respectively and the outputs on conductors 32, 34, 36, 38 and 40 are each jointly connected to the anodes of LEDs 58 and 70, 56 and 72, 54 and 74, 52 and 76, and 50 and 78 respectively. Thus, the anodes of two LEDs in all cases except the zero LED 64 are jointly connected to one of the outputs of the priority encoder 22.

The sign output from A-to-D converter 14 on conductor 24 is presented by a conductor 80 to all of the cathodes of the negative LEDs 66–78 and by a conductor 82 to an inverter 84 which inverts the signal on conductor 82 and presents the inverted signal by a conductor 86 to all of the cathodes of the positive LEDs 50–62 and the zero LED 64.

Since the output on conductor 24 is either 0 indicating negative or 1 indicating positive and since the LEDs 50–78 will only light if there is a positive signal on the anode and a 0 or negative signal on the cathode, it is seen that when the signal on conductor 24 is negative, any one of the negative LEDs 66–78 could be lighted if there was a positive signal on its anode while because inverter 84 reverses the sign of the signal on conductor 24, none of the positive LEDs 50–62 or the 0 LED 64 are capable of being lighted. Accordingly, if a signal of a magnitude, for example 6, and a sign negative were to appear from the A-to-D converter 14, then a positive output would appear on conductor 38 at the output of encoder 22 and LED 76 would light since the sign of the signal on conductors 24 and 80 is negative. None of the other negative LEDs would light since there would be no positive signal at their anode and the LED 52, although receiving a positive signal from conductor 38, would not light since its cathode was positive from inverter 84 and conductor 86. On the other hand, if a signal of magnitude +2 were to appear from A-to-D converter 14, then all of the cathodes of the negative LEDs 66–78 would be positive and incapable of lighting but because of inverter 84, all of the anodes of the positive LEDs 50–62 and the 0 LED 64 would be negative. Thus, when a positive signal appeared on line 30 from encoder 22, LED 60 would light and no other. At a proper focus position, a zero signal would appear from encoder 14 and a positive signal or "1" would appear on conductor 24. Again, all of the negative LEDs 66–78 could not operate but because of inverter 84, any of the positive LEDs 50–62 and the zero LED 64 could be lit. However, a positive signal would only appear on conductor 26 from encoder 22 and accordingly LED 64 would light indicating a proper focus position.

It is thus seen that with the circuit described in FIG. 1, a visual representation can be obtained of the relative position between the lens and the proper focus point. This may be used by the operator to manually focus the camera since, as he turns to focus, the lights will light in the fashion described above until he has reached the zero or proper focus position or, if the apparatus is used in an auto focus camera, he can observe the operation and feel assured that the camera has properly focused when he desires to take a picture. Likewise, it may be of interest to the subject being photographed what the condition of focus is and accordingly if the indicator were mounted in such a way as to be visible to the subject, he could move back and forth to get himself into a proper focus position.

Figure 2:
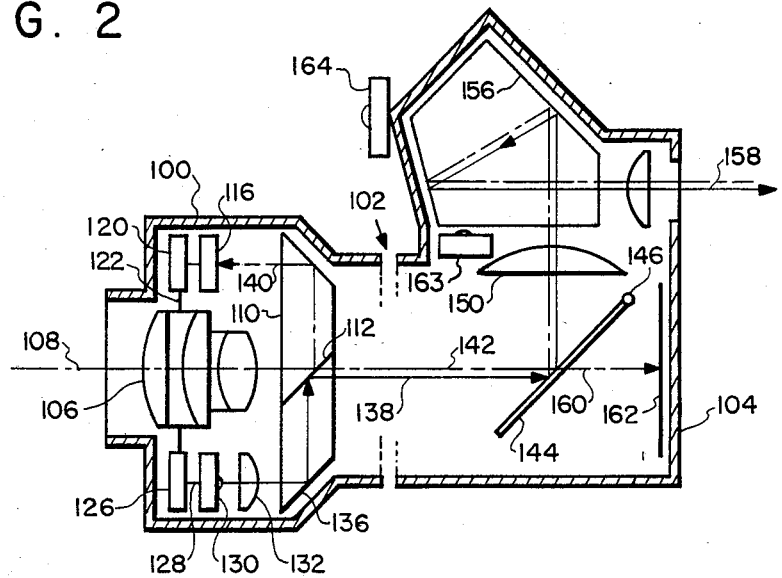
FIG. 2 shows alternate pairs for mounting the indicator of the present invention in or on a camera.

In FIG. 2, a sectional view of a camera is shown in which several positions are set forth for mounting the LED display described in connection with FIG. 1. In FIG. 2, a camera lens body 100 is shown connected at a point shown by arrow 102 to a camera body identified by reference numeral 104. Within the lens body 100 is the taking lens structure 106 having an optical axis 108. Also within the lens body is a prism 110 having a half-silvered mirror portion 112 located to intercept the optical axis 108. In the upper portion of the lens housing is a box 116 which may be the auto focus sensor module described in connection with the circuit of the above-referred to copending application and a box 120 which may comprise the electronics associated with the auto focus circuit. The box 120 in the upper part of the lens body is connected by a conductor 122 to a box 126 in the lower portion of the lens housing which may be the electronics associated with the indicator structure described in connection with FIG. 1. Box 126 is connected by a conductor 128 representative of the various connections used in connection with FIG. 1 to a box labelled 130 which may be the LED display. Light from the LED display 130 passes through a lens 132 and is reflected off a surface 135 of prism 110 and thence upwardly to the partially silvered surface 112 where it is reflected to the right as shown by arrow 138. Light going along the optics axis 108 is reflected partially off the surface 112 and passes in the direction of arrow 140 to the sensor optics box 116. Light travelling along optic axis 108 also passes adjacent arrow 138 along a line 142 to a mirror 144 in the camera body 104 pivoted about a point 146. Mirror 144 represents the standard mirror used in an SLR camera and operates to reflect light up through a lens 150 to a prism 156 where it is internally reflected and emerges from the back of the camera along a line 158 for viewing by the photographer. As seen in FIG. 2, the photographer will observe not only the scene being viewed but the light being emitted from the LED display 130 and thus may either manually set his camera by twisting the lens body 100 or may watch the auto focus apparatus operate until the proper LED indicative of a zero situation is seen. When this occurs, the operator may then actuate the camera picture taking apparatus in which case the mirror 144 will flip upwardly and light passing to the mirror 144 will not emerge along the direction of arrow 160 to the film plane 162 and will thus expose the film. In order to prevent the LED from also exposing the film, when the automatic aperture (which is mechanically controlled from the camera body) is stopped down as the picture is taken, the LED may be turned off so that the images would not appear on the film. One could also have the beam splitter 112 moveable along with mirror 144 so as to swing out of the light path when the lens stops down and this would help assure that no light was lost to reach the film.

Of course, the indicator 130 need not necessarily be in the lens housing 100, which is an advantage when lens manufacturers wish to provide auto focus capabilities for cameras, but instead may be within the camera housing 104 in a variety of places. For example, in FIG. 2, an indicator box 163 is shown on the bottom left side of prism 156 as an alternate location. Indicator 163 would be actuated by sensing circuitry (not shown) in housing 104 perhaps located on the bottom right side of prism 156 to receive light from the lens 106. The light from indicator box 163 would be internally reflected by prism 156 and would be seen by the viewer at the top of his view above the position shown by arrow 158.

If it is desired that the subject being photographed view the operation of the indicator, the indicator may be placed on the outer portion of the camera, say at shown at box 164 or any other convenient place on the camera that faces away from the photographer. Furthermore, instead of having the LED module 130 mounted in the lens the LED box can be placed elsewhere within the body of the camera 104 so as to provide a light path to the viewer along arrow 158.

It is thus seen that I have provided a novel indicator for use with an auto focus camera which provides a visual indication of the direction that the taking lens has to be moved in order to achieve a proper focus position as well as the visual indication of the approximate amount necessary to reach the desired point. Many obvious alterations and modifications to the apparatus shown in connection with the preferred embodiment will occur to those skilled in the art and I do not wish to be limited by the specific disclosures used in connection therewith. I intend only to be limited by the following claims.

The embodiments of the invention in which an exclusive property or right is claimed are defined as follows:

1. A photographic indicator for use with a camera autofocus system which produces an output signal of magnitude indicative of the amount the camera lens should be moved to each a proper focus position, and of a first or second characteristic indicative of the direction the camera lens should be moved, to reach the proper focus position comprising:

a plurality of signal reponsive devices, a first group of which comprises devices each of which is responsive to an output signal of a different magnitude but only when the output signal is of the first characteristic and a second group of which comprises devices each of which is responsive to an output signal of a different magnitude, but only when the output signal is of the second characteristic, so that the response of the individual device is indicative of the amount and direction that the camera lens should be moved to reach a proper focus position, means connected to receive the output signal and operable to provide a resultant signal on one of a plurality of output terminals depending on the magnitude, and to provide a characteristic signal on a further terminal, and means connecting one device from each group to a different one of the output terminals, while connecting all of the devices from each group to the further terminal.

2. Apparatus according to claim 1, wherein the signals at the output terminals are either "1"'s or "0"'s and the signal at the further terminal is a "1" when the output signal is of the first characteristic and is a "0" when the output signal is of the second characteristic, and the devices are light-emitting diodes, each with first and second electrodes, first electrodes of the devices of the first group being connected together and to the further terminal, the first electrodes of the devices of the second group being connected together and to an inverter connected to the further terminal, the second electrodes of a first one of the devices of the first group being connected to the second electrode of a first one of the devices of the second group and to a first of the output terminals and a second one of the devices of the first group being connected to the second electrode of the second one of the devices of the second group and to a second of the output terminals.

* * * * *